Patented Dec. 9, 1924.

1,518,710

UNITED STATES PATENT OFFICE.

RICHARD TOBLER, OF BASEL, SWITZERLAND, ASSIGNOR TO SOCIETY OF CHEMICAL INDUSTRY IN BASLE, OF BASEL, SWITZERLAND.

MANUFACTURE OF NEW VAT DYESTUFFS.

No Drawing.  Application filed May 21, 1924. Serial No. 714,980.

*To all whom it may concern:*

Be it known that I, RICHARD TOBLER, a citizen of Switzerland, and residing at Basel, Switzerland, have invented new and useful Improvements in the Manufacture of New Vat Dyestuffs, of which the following is a full, clear, and exact specification.

The present invention relates to new indigoid dyestuffs which are particularly valuable for the production of fast tints on cotton. It comprises the new dyestuffs, the method making same, as well as the fibres dyed with the new dyestuffs.

It has been found that new vat dyestuffs are obtained by condensing the 2:1-napthindoxyl with halogen substitution products of isatin. The new dyestuffs have most probably the general formula:

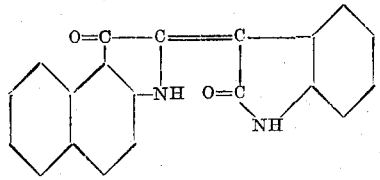

in which the benzene nucleus is halogenated. They constitute brown powders soluble in concentrated sulphuric acid to blue solutions, forming with hydrosulphite and caustic soda lye green-yellow to brown-yellow vats from which cotton is dyed fast brown to olive tints.

The following examples illustrate the invention, the parts being by weight:—

*Example 1.*

183 parts of 2:1-naphthindoxyl and 181.5 parts of 7-chloro-isatin are suspended in 4,000 parts of alcohol and on addition of 5 parts of concentrated sodium carbonate solution, the whole is heated to boiling. After boiling for some hours the condensation is complete. The dyestuff which has been separated in a good yield is filtered, washed and dried. It constitutes a brown powder soluble in concentrated sulphuric acid to a blue solution, forming with hydrosulphite and caustic soda lye a brown-yellow vat from which cotton is dyed fast brown tints.

*Example 2.*

183 parts of 2:1-napthindoxyl and 305 parts of 5:7-dibromo-isatin are suspended in 4,000 parts of alcohol and on addition of 5 parts of concentrated ammonia, the whole is heated to boiling. After boiling for some hours the condensation is complete. The dyestuff which has separated in a good yield is filtered, washed and dried. It constitutes a brown powder soluble in concentrated sulphuric acid to a blue solution, forming with hydrosulphite and caustic soda lye a green-yellow vat from which cotton is dyed fast olive tints.

What I claim is:

1. Process for the manufacture of new indigoid dyestuffs, consisting in condensing the 2:1-naphthindoxyl with halogen substitution products of isatin.

2. Process for the manufacture of new indigoid dyestuffs, consisting in condensing the 2:1-napthindoxyl with bromo-substitution products of isatin.

3. Process for the manufacture of new indigoid dyestuffs, consisting in condensing the 2:1-naphthindoxyl with 5:7-dibromo-isatin.

4. The herein described new dyestuffs having most probably the general formula:

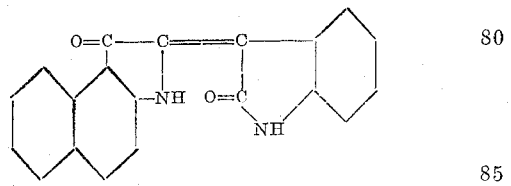

in which the benzene nucleus is halogenated, which dyestuffs constitute brown powders soluble in concentrated sulphuric acid to a blue solution, forming with hydrosulphite and caustic soda lye green-yellow to brown-yellow vats from which cotton is dyed fast brown to olive tints.

5. The herein described new dyestuffs having most probably the general formula:

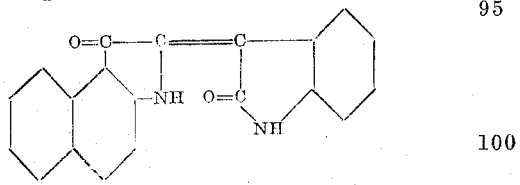

in which the benzene nucleus is brominated, which dyestuffs constitute brown powders soluble in concentrated sulphuric acid to a blue solution, forming with hydrosulphite and caustic soda lye green-yellow to brown-yellow vats from which cotton is dyed fast brown to olive tints.

6. The herein described new dyestuff having most probably the formula:

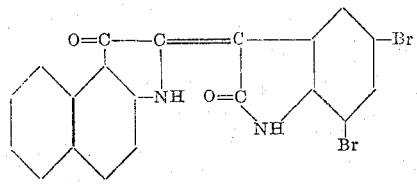

which dyestuff constitutes a brown powder soluble in concentrated sulphuric acid to a blue solution, forming with hydrosulphite and caustic soda lye a green-yellow vat from which cotton is dyed fast olive tints.

7. The material dyed with the dyestuffs as obtained according to claim 4.

8. The material dyed with the dyestuffs as obtained according to claim 5.

9. The material dyed with the dyestuff as obtained according to claim 6.

In witness whereof I have hereunto signed my name this 9th day of May, 1924, in the presence of two subscribing witnesses.

RICHARD TOBLER.

Witnesses:
AMAND BRAUN,
MADELEINE SPENGLER.